US009455628B2

United States Patent
Tomioka et al.

(10) Patent No.: US 9,455,628 B2
(45) Date of Patent: Sep. 27, 2016

(54) VOLTAGE REGULATOR WITH OVERSHOOT SUPPRESSION CIRCUIT AND CAPABILITY TO STOP OVERSHOOT SUPPRESSION

(71) Applicant: Seiko Instruments Inc., Chiba-shi, Chiba (JP)

(72) Inventors: Tsutomu Tomioka, Chiba (JP); Masakazu Sugiura, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 136 days.

(21) Appl. No.: 14/596,816

(22) Filed: Jan. 14, 2015

(65) Prior Publication Data
US 2015/0214838 A1    Jul. 30, 2015

(30) Foreign Application Priority Data
Jan. 27, 2014   (JP) ................... 2014-012661

(51) Int. Cl.
G05F 1/571   (2006.01)
H02M 3/156   (2006.01)
G05F 1/56    (2006.01)

(52) U.S. Cl.
CPC ............... *H02M 3/156* (2013.01); *G05F 1/56* (2013.01); *G05F 1/571* (2013.01)

(58) Field of Classification Search
CPC .......... G05F 1/562; G05F 1/571; G05F 1/575
See application file for complete search history.

(56) References Cited

U.S. PATENT DOCUMENTS

| 6,201,375 | B1* | 3/2001 | Larson | G05F 1/573 323/277 |
| 2001/0050546 | A1* | 12/2001 | Marty | G05F 1/575 323/280 |
| 2011/0156688 | A1* | 6/2011 | Lin | H02M 1/32 323/284 |
| 2014/0269136 | A1* | 9/2014 | Kamiya | G11C 5/14 365/226 |

FOREIGN PATENT DOCUMENTS

JP       2009-53783 A    3/2009

* cited by examiner

*Primary Examiner* — Harry Behm
(74) *Attorney, Agent, or Firm* — Brinks Gilson & Lione

(57) ABSTRACT

To provide a voltage regulator capable of preventing a reduction in output voltage and an increase in output noise in a steady state without performing suppression of an overshoot. A voltage regulator is equipped with an overshoot detection circuit which detects an overshoot on the basis of an output voltage, an overshoot suppression circuit which controls an output terminal of an error amplifier circuit, based on the output of the overshoot detection circuit, and a driver state discrimination circuit which discriminates the state of an output transistor, based on an output voltage of the error amplifier circuit. The driver state discrimination circuit is configured to control the operation of the overshoot suppression circuit.

7 Claims, 7 Drawing Sheets

US 9,455,628 B2

VOLTAGE REGULATOR WITH OVERSHOOT SUPPRESSION CIRCUIT AND CAPABILITY TO STOP OVERSHOOT SUPPRESSION

RELATED APPLICATIONS

This application claims priority under 35 U.S.C. §119 to Japanese Patent Application No. 2014-012661 filed on Jan. 27, 2014, the entire content of which is hereby incorporated by reference.

BACKGROUND OF THE INVENTION

1. Field of the Invention

The present invention relates to a voltage regulator capable of stabilizing an output voltage even if a power supply fluctuates.

2. Background Art

A related art voltage regulator will be described. FIG. 7 is a circuit diagram illustrating the related art voltage regulator.

The related art voltage regulator is equipped with PMOS transistors 702, 703, 710 and 106, NMOS transistors 704, 705, 706, 707, 708 and 709, a reference voltage generation circuit 701, resistors 104, 105 and 712, a capacitor 711, a ground terminal 100, an output terminal 102, and a power supply terminal 101.

Since the capacitor 711 has been charged to the same voltage as an output voltage Vout of the output terminal 102 when the output voltage Vout thereof is in a steady state, the gate voltages of the NMOS transistors 707 and 708 are 0V. When the output voltage Vout rapidly rises on some condition and the raised voltage exceeds the gate threshold voltages of the NMOS transistors 707 and 708, the NMOS transistors 707 and 708 are turned on. Then, when the NMOS transistor 707 is turned on, a drain current flows through the NMOS transistor 707. This current is added to a bias current corresponding to a constant current generated by the NMOS transistor 706 to increase a bias current of a differential amplifier circuit.

With the rise in the output voltage Vout, the drain voltage of the NMOS transistor 705 is reduced. Since the bias current is increased at this time, a drain current of the NMOS transistor 705 also increases, so that the gate capacitance of the PMOS transistor 710 connected to the drain of the NMOS transistor 705 can be charged rapidly. Accordingly, the PMOS transistor 710 can be turned on quickly as compared with the case of generating the bias current only in the NMOS transistor 706.

As a result, since it is possible to quickly raise the gate voltage of the PMOS transistor 106 and quickly increase the on resistance of the PMOS transistor 106, the current supplied from the power supply terminal 101 can be suppressed quickly, and an overshoot can be suppressed (refer to, for example, FIG. 1 in Patent Document 1).

[Patent Document 1]
Japanese Patent Application Laid-Open No. 2009-53783

SUMMARY OF THE INVENTION

The related art voltage regulator is however accompanied by a problem that since the overshoot is detected by the capacitor connected to the output terminal even in the steady state in which the overshoot is not much generated, the overshoot tends to be excessively detected, thus reducing the output voltage and increasing output noise.

The present invention has been made in view of the above problem and provides a voltage regulator capable of preventing a reduction in output voltage and an increase in output noise without performing suppression of an overshoot in a steady state.

In order to solve the related art problems, one aspect of the present invention provides a voltage regulator configured as follows:

The voltage regulator is equipped with an overshoot detection circuit which detects an overshoot on the basis of an output voltage, an overshoot suppression circuit which controls an output terminal of an error amplifier circuit, based on the output of the overshoot detection circuit, and a driver state discrimination circuit which discriminates the state of an output transistor, based on an output voltage of the error amplifier circuit. The driver state discrimination circuit is configured to control the operation of the overshoot suppression circuit.

The voltage regulator of the present invention is capable of preventing a reduction in output voltage and an increase in output noise in a normal state since it is configured so as to suppress an overshoot of the output voltage only in a non-regulated state. An effect is also brought about that power consumption in a steady state can be reduced.

DETAILED DESCRIPTION OF THE PREFERRED EMBODIMENTS

Preferred embodiments of the present invention will hereinafter be described with reference to the accompanying drawings.

<First Embodiment>

Figure 1:
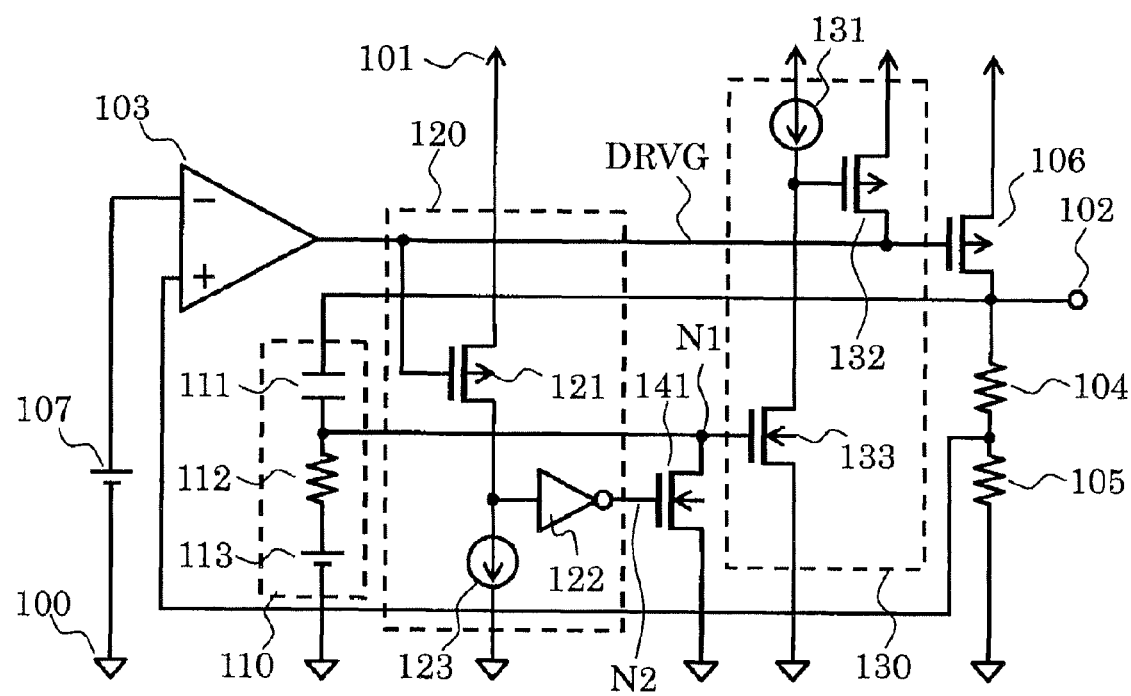
FIG. 1 is a circuit diagram illustrating a configuration of a voltage regulator according to a first embodiment.

FIG. 1 is a circuit diagram of a voltage regulator according to a first embodiment.

The voltage regulator according to the first embodiment is equipped with an error amplifier circuit 103, PMOS transistors 121, 132 and 106, NMOS transistors 141 and 133, a reference voltage circuit 107, constant current circuits 123 and 131, a constant voltage circuit 113, resistors 104, 105 and 112, a capacitor 111, an inverter 122, a ground terminal 100, an output terminal 102, and a power supply terminal 101. An overshoot detection circuit 110 is configured by the capacitor 111, the resistor 112, and the constant voltage circuit 113. A driver state discrimination circuit 120 is configured by the PMOS transistor 121, the constant current circuit 123, and the inverter 122. An overshoot suppression circuit 130 is configured by the constant current circuit 131, the PMOS transistor 132, and the NMOS transistor 133.

A description will next be made about the connections of the voltage regulator according to the first embodiment.

The error amplifier circuit 103 has an inversion input terminal connected to a positive electrode of the reference voltage circuit 107, a non-inversion input terminal connected to a connecting point of the resistors 104 and 105, and an output terminal connected to a gate of the PMOS transistor 106. A negative electrode of the reference voltage circuit 107 is connected to the ground terminal 100. The other terminal of the resistor 105 is connected to the ground terminal 100. The other terminal of the resistor 104 is connected to the output terminal 102. The capacitor 111 has one terminal connected to the output terminal 102 and the other terminal connected to a gate of the NMOS transistor 133. The resistor 112 has one terminal connected to the gate of the NMOS transistor 133 and the other terminal connected to a positive electrode of the constant voltage circuit 113. A negative electrode of the constant voltage circuit 113 is connected to the ground terminal 100. The PMOS transistor 121 has a gate connected to the output terminal of the error amplifier circuit 103, a drain connected to the input of the inverter 122, and a source connected to the power supply terminal 101. The constant current circuit 123 has one terminal connected to the input of the inverter 122 and the other terminal connected to the ground terminal 100. The NMOS transistor 141 has a gate connected to the output of the inverter 122, a drain connected to the gate of the NMOS transistor 133, and a source connected to the ground terminal 100. The NMOS transistor 133 has a drain connected to a gate of the PMOS transistor 132 and a source connected to the ground terminal 100. The constant current circuit 131 has one terminal connected to the power supply terminal 101 and the other terminal connected to the gate of the PMOS transistor 132. The PMOS transistor 132 has a drain connected to the gate of the PMOS transistor 106 and a source connected to the power supply terminal 101. The PMOS transistor 106 has a drain connected to the output terminal 102 and a source connected to the power supply terminal 101.

The operation of the voltage regulator according to the first embodiment will next be described.

When a power supply voltage VDD is inputted to the power supply terminal 101, the voltage regulator outputs an output voltage Vout from the output terminal 102. The resistors 104 and 105 divide the output voltage Vout and output a feedback voltage Vfb. The error amplifier circuit 103 compares a reference voltage Vref of the reference voltage circuit 107 inputted to the inversion input terminal thereof and the feedback voltage Vfb inputted to the non-inversion input terminal thereof and controls the gate voltage of the PMOS transistor 106 operated as an output transistor in such a manner that the output voltage Vout becomes constant.

When the output voltage Vout is higher than a predetermined voltage, the feedback voltage Vfb becomes higher than the reference voltage Vref. Accordingly, since the output signal (the gate voltage of the PMOS transistor 106) of the error amplifier circuit 103 becomes high and the PMOS transistor 106 goes off, the output voltage Vout becomes low. Further, when the output voltage Vout is lower than the predetermined voltage, a reverse operation to the above is performed so that the output voltage Vout becomes high. Thus, the voltage regulator is operated in such a manner that the output voltage Vout becomes constant. A state in which the output voltage Vout is controlled to be constant is called a steady state.

When the power supply voltage VDD inputted to the power supply terminal 101 is still low, a voltage lower than the predetermined voltage is outputted as the output voltage Vout of the output terminal 102. This state of the voltage regulator is referred to as a non-regulated state. The gate of the NMOS transistor 133 is assumed to be a node N1, the gate of the NMOS transistor 141 is assumed to be a node N2, and the gate of the PMOS transistor 106 is assumed to be a node DRVG, respectively.

Figure 2:
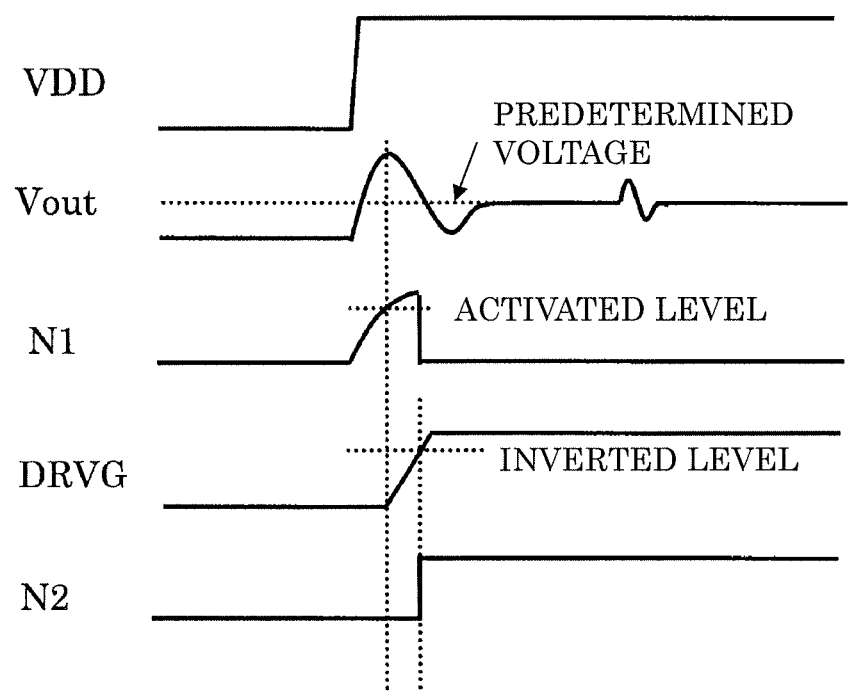
FIG. 2 is a diagram illustrating a temporal change in the voltage of each node in the voltage regulator according to the first embodiment.

FIG. 2 is a diagram illustrating a temporal change in the voltage of each node in the voltage regulator according to the first embodiment.

When the voltage regulator is in the non-regulated state, the output voltage Vout becomes a voltage lower than the predetermined voltage. Therefore, since the feedback voltage Vfb becomes lower than the reference voltage Vref and the voltage of the node DRVG is lowered, the gate-source voltage of the PMOS transistor 106 becomes large.

Here, the inverted level of the driver state discrimination circuit 120 has been set to a voltage lower than the voltage of the node DRVG in the steady state. Thus, since the voltage of the node DRVG falls below the inverted level of the driver state discrimination circuit 120, a current made to flow by the PMOS transistor 121 becomes larger than a current of the constant current circuit 123. Further, since the input of the inverter 122 becomes a power supply voltage VDD level, the node N2 is brought to an Lo level to turn off the NMOS transistor 141, whereby the overshoot suppression circuit 130 is turned into an operable state.

When the power supply fluctuates from this state to reach the steady state, such an overshoot as illustrated in FIG. 2 occurs in the output voltage Vout. The overshoot detection circuit 110 detects the overshoot and raises the voltage of the node N1. When a current made to flow by the NMOS transistor 133 exceeds a current of the constant current circuit 131, the gate voltage of the PMOS transistor 132 is lowered so that the PMOS transistor 132 is turned on to raise the voltage of the node DRVG. Since the PMOS transistor 106 is turned off in this way, the overshoot of the output voltage Vout is suppressed.

When the voltage of the node DRVG further rises and exceeds the inverted level of the driver state discrimination circuit 120, the driver state discrimination circuit 120 outputs a signal of a High level to the node N2 to turn on the NMOS transistor 141. Then, the node N1 is brought to an Lo level to stop the operation of the overshoot suppression circuit 130. Thus, the overshoot suppression circuit 130 does not operate in the steady state as illustrated in FIG. 2 and is no longer operated so as to raise the voltage of the node DRVG even if the overshoot occurs in the output voltage Vout.

Thus, during the steady state, the operation of the overshoot suppression circuit 130 is stopped. Only during the non-regulated state, the overshoot suppression circuit 130 can be operated to suppress the overshoot of the output voltage Vout. Further, since the overshoot suppression circuit 130 does not operate in the steady state, power consumption in the steady state can be reduced, and a reduction in the output voltage Vout and an increase in output noise can be prevented from occurring.

As described above, the voltage regulator according to the first embodiment operates the overshoot suppression circuit only in the non-regulated state and stops the operation of the overshoot suppression circuit in the steady state to make it possible to prevent the reduction in the output voltage Vout and the increase in the output noise. It is also possible to reduce the power consumption in the steady state.

Incidentally, although the overshoot detection circuit 110 and the overshoot suppression circuit 130 have been described using the configuration of FIG. 1, they are not limited to this configuration. Any configuration may be adopted if such a configuration as capable of detecting and suppressing the overshoot of the output voltage Vout is taken.

<Second Embodiment>

Figure 3:
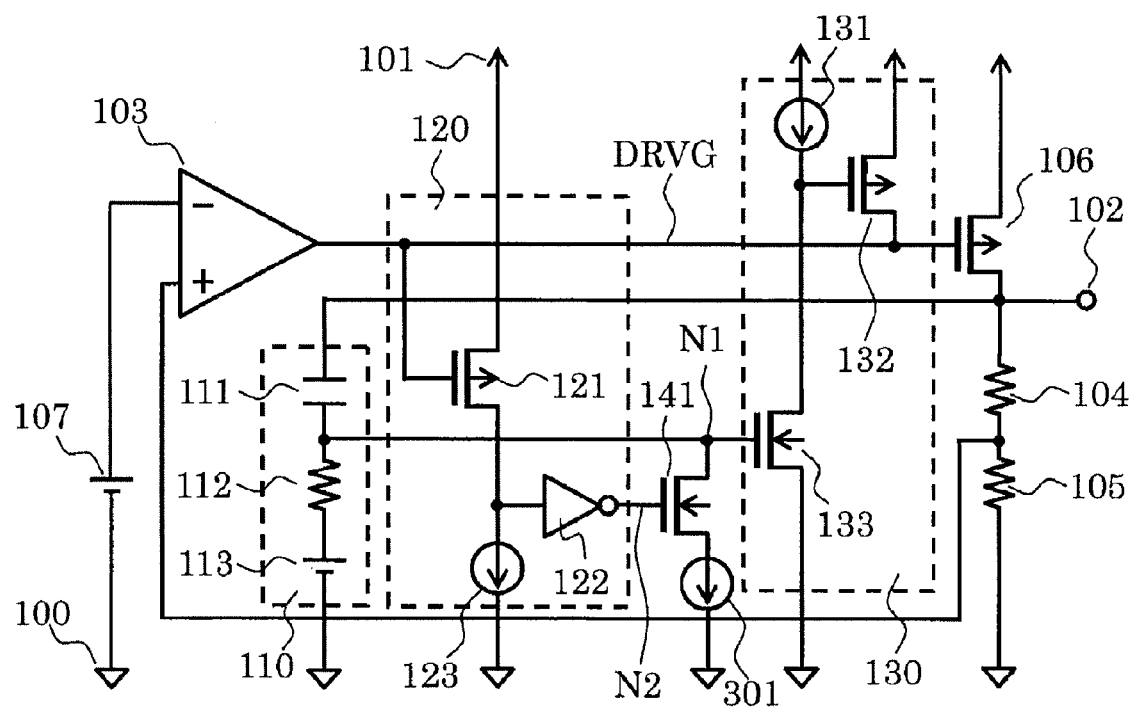
FIG. 3 is a circuit diagram illustrating a configuration of a voltage regulator according to a second embodiment.

FIG. 3 is a circuit diagram of a voltage regulator according to a second embodiment. A difference from FIG. 1 resides in that a constant current circuit 301 is connected between the source of the NMOS transistor 141 and the ground terminal. Others are similar to those in FIG. 1.

The operation of the voltage regulator according to the second embodiment will be described. When the power supply voltage VDD fluctuates to change from the non-regulated state to the steady state, the NMOS transistor 141 is gently turned on by using the constant current circuit 301, i.e., the node N1 is slowly brought to an Lo level to make it possible to gently stop the operation of the overshoot suppression circuit 130. Thus, after the overshoot of the output voltage Vout has been completely suppressed, it is possible to stop the operation of the overshoot suppression circuit 130 and prevent the operation of the overshoot suppression circuit 130 from stopping while the overshoot is not being suppressed. Others are similar to the first embodiment.

As described above, the voltage regulator according to the second embodiment operates the overshoot suppression circuit only in the non-regulated state and stops the operation of the overshoot suppression circuit in the steady state to make it possible to prevent the reduction in the output voltage Vout and the increase in the output noise. It is also possible to reduce the power consumption in the steady state. Further, it is possible to prevent the operation of the overshoot suppression circuit from stopping while the overshoot is not being suppressed.

<Third Embodiment>

Figure 4:
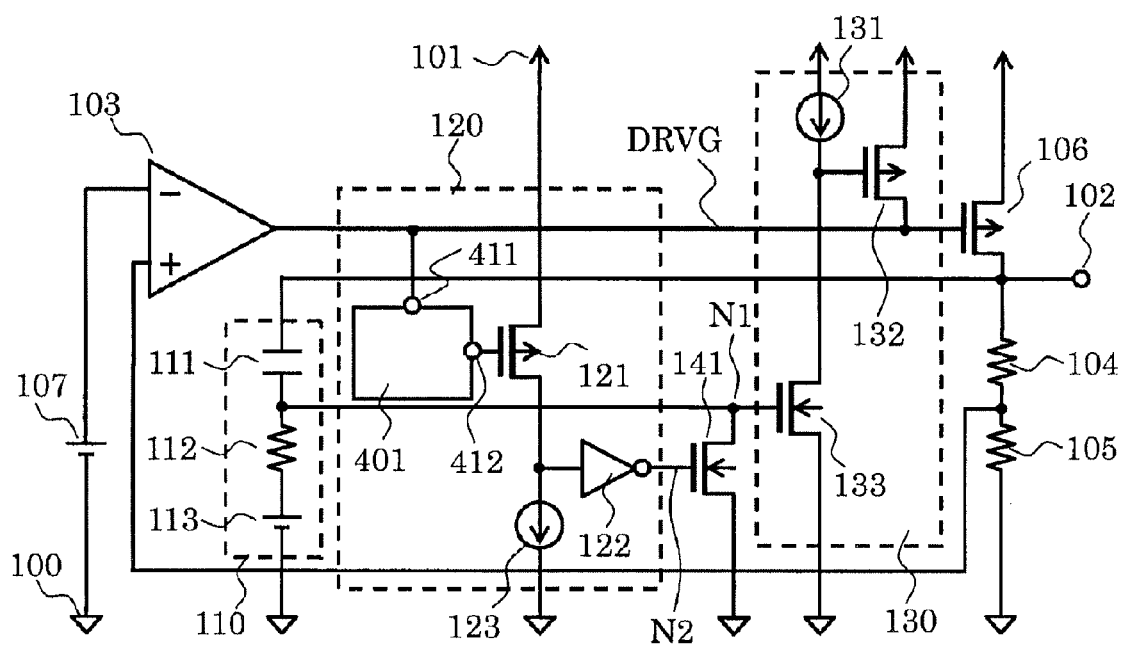
FIG. 4 is a circuit diagram illustrating a configuration of a voltage regulator according to a third embodiment.

FIG. 4 is a circuit diagram of a voltage regulator according to a third embodiment. A difference from FIG. 1 resides in that a level shift circuit 401 is connected between the gate of the PMOS transistor 121 and the node DRVG.

Figure 5:
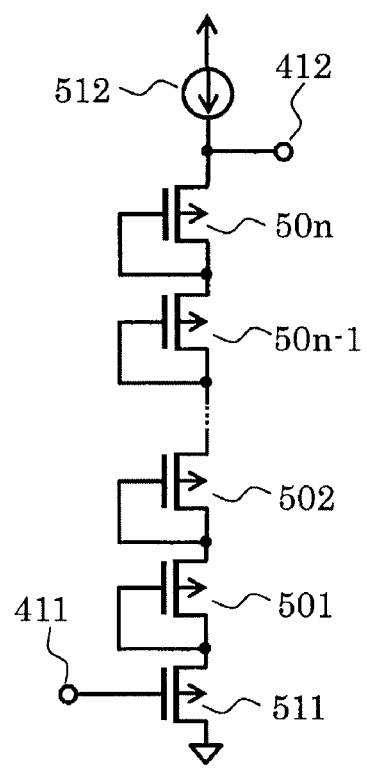
FIG. 5 is a circuit diagram illustrating one example of a level shift circuit.

FIG. 5 is a circuit diagram illustrating one example of a circuit diagram of the level shift circuit 401. The level shift circuit 401 is comprised of a PMOS transistor 511, PMOS transistors 501 to 50*n* which are n diode-connected impedance elements, a constant current circuit 512, an input terminal 411, and an input terminal 412. Others are similar to those in FIG. 1.

A description will be made about the connections of the voltage regulator according to the third embodiment. The PMOS transistor 511 has a gate connected to the output of the error amplifier circuit 103 via the input terminal 411 and a drain connected to the ground terminal 100. The diode-connected PMOS transistors 501 to 50*n* are connected in series by n pieces between the source of the PMOS transistor 511 and the output terminal 412. The constant current circuit 512 has one terminal connected to the power supply terminal 101 and the other terminal connected to the output terminal 412. Others are similar to those in FIG. 1.

The operation of the voltage regulator according to the third embodiment will be described. When the threshold values of the PMOS transistor 511 and the PMOS transistors 501 to 50*n* are respectively assumed to be Vtp, the voltage between the input terminal 411 of the level shift circuit 401 and the output terminal 412 thereof is represented as $(n+1) \times |Vtp|$. Here, n is the number of the PMOS transistors 501 to 50*n*. Adjusting the number of the PMOS transistors enables the voltage between the input terminal 411 of the level shift circuit 401 and the output terminal 412 thereof to be adjusted. The sum of the voltage between the input terminal 411 of the level shift circuit 401 and the output terminal 412 thereof and the threshold voltage of the PMOS transistor 121 is the same as the inverted level of the driver state discrimination circuit 120. The inverted level of the driver state discrimination circuit 120 can be adjusted by using the level shift circuit 401. Thus, after the voltage of the node DRVG to stop the overshoot suppression circuit 130 has been arbitrarily set and the overshoot of the output voltage Vout has been suppressed, it is possible to arbitrarily set the time required to stop the operation of the overshoot suppression circuit 130.

Figure 6:
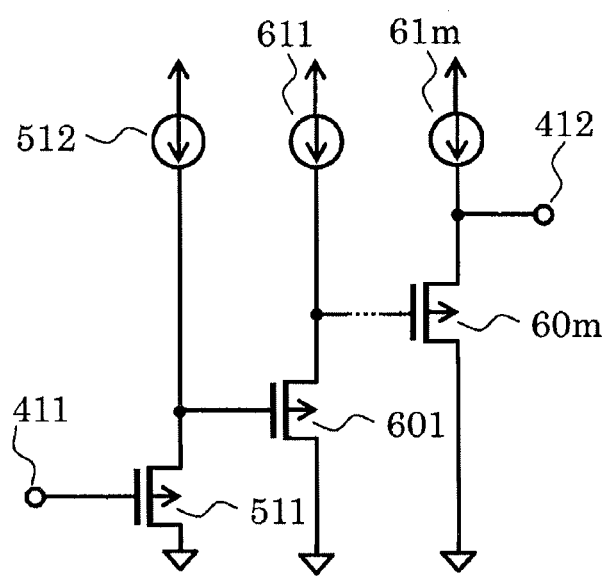
FIG. 6 is a circuit diagram illustrating another example of the level shift circuit.
Figure 7:
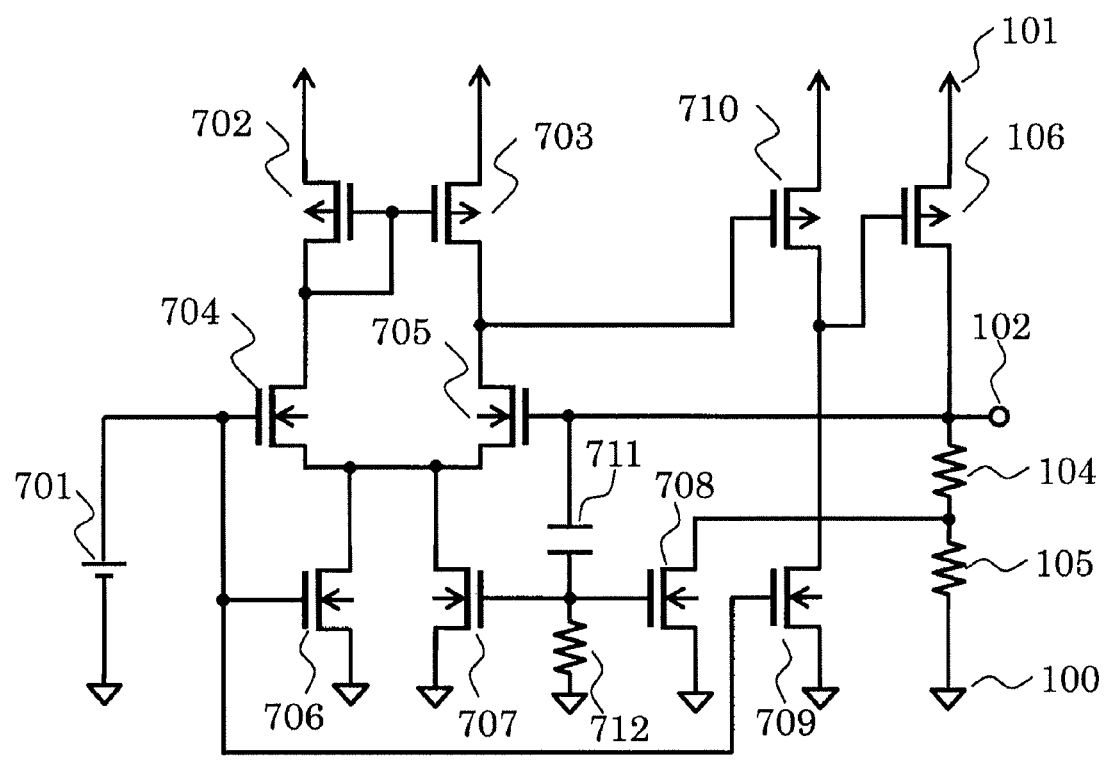
FIG. 7 is a circuit diagram illustrating a configuration of a related art voltage regulator.

FIG. 6 is a circuit diagram illustrating another example of the level shift circuit 401. There are provided a PMOS transistor 511 having a gate connected to the input terminal 411, a drain connected to the ground terminal 100, and a source connected to the constant current circuit 512, and PMOS transistors 601 to 60*m* respectively provided between the source of the PMOS transistor 511 and the output terminal 412 and having sources to which the constant current circuits 611 to 61*m* are connected. When the threshold values of the PMOS transistor 511 and the PMOS transistors 601 to 60*m* are respectively assumed to be Vtp, the voltage between the input terminal 411 of the level shift circuit 401 and the output terminal 412 thereof is represented as $(m+1) \times |Vtp|$. Therefore, the voltage between the input terminal 411 of the level shift circuit 401 and the output terminal 412 thereof can be adjusted by adjusting the number of the PMOS transistors 601 to 60*m*. The sum of the voltage between the input terminal 411 of the level shift circuit 401 and the output terminal 412 thereof and the threshold voltage of the PMOS transistor 121 is the same as the inverted level of the driver state discrimination circuit 120. The inverted level of the driver state discrimination circuit 120 can be adjusted by using the level shift circuit 401. Thus, after the voltage of the node DRVG to stop the overshoot suppression circuit 130 has been arbitrarily set, and the overshoot of the output voltage Vout has been suppressed, it is possible to arbitrarily set the time required to stop the operation of the overshoot suppression circuit 130.

Incidentally, although the NMOS transistor 141 of FIG. 4 has been used as the transistor to stop the operation of the overshoot suppression circuit 130, any configuration may be adopted without being limited to this configuration if such a configuration as to be capable of stopping the operation of the overshoot suppression circuit 130 in response to the signal of the driver state discrimination circuit 120 is taken.

Also, the n diode-connected PMOS transistors 501 to 50*n* in FIG. 5 may be replaced with resistors. Further, although the level shift circuit 401 has been described using the configuration of FIG. 5 or FIG. 6, any configuration may be adopted without being limited to this configuration if such a configuration as to be capable of adjusting the inverted level of the driver state discrimination circuit 120 is provided.

As described above, the voltage regulator according to the third embodiment operates the overshoot suppression circuit only in the non-regulated state and stops the operation of the overshoot suppression circuit in the steady state to make it possible to prevent a reduction in the output voltage Vout and an increase in output noise. It is also possible to reduce power consumption in the steady state. Further, it is possible to arbitrarily set the time required to stop the operation of the overshoot suppression circuit after the overshoot of the output voltage Vout has been suppressed.

What is claimed is:

1. A voltage regulator comprising:
    a reference voltage circuit which generates a reference voltage;
    an output transistor which outputs an output voltage;
    an error amplifier circuit which amplifies and outputs a difference between a divided voltage obtained by dividing the output voltage and the reference voltage and controls a gate of the output transistor;
    an overshoot detection circuit having an input terminal to which a voltage based on the output voltage is inputted; and
    an overshoot suppression circuit having an input terminal to which an output of the overshoot detection circuit is inputted, and an output terminal connected to an output terminal of the error amplifier circuit, said voltage regulator comprising:
        a driver state discrimination circuit which has an input terminal connected to the output terminal of the error amplifier circuit and discriminates a state of the output transistor; and
        a first transistor having a gate connected to an output terminal of the driver state discrimination circuit, and a drain connected to the input terminal of the overshoot suppression circuit, said first transistor stopping the operation of the overshoot suppression circuit in response to the output of the driver state discrimination circuit.

2. The voltage regulator according to claim 1, wherein the first transistor has a source to which a first constant current circuit is connected.

3. The voltage regulator according to claim 1, wherein the driver state discrimination circuit comprises:
    a second transistor having a gate connected to the output terminal of the error amplifier circuit,
    a second constant current circuit connected to a drain of the second transistor, and
    an inverter having an input connected to the drain of the second transistor and an output connected to the gate of the first transistor.

4. The voltage regulator according to claim 3, wherein the driver state discrimination circuit includes a level shift circuit provided between the output terminal of the error amplifier circuit and the gate of the second transistor.

5. The voltage regulator according to claim 4, wherein the level shift circuit comprises:
    a third transistor having a gate connected to an input terminal of the level shift circuit and a drain connected to a ground terminal,
    a third constant current circuit having one terminal connected to a power supply terminal and the other terminal connected to an output terminal of the level shift circuit, and
    an impedance element provided between a source of the third transistor and the other terminal of the third constant current circuit.

6. The voltage regulator according to claim 5, wherein the impedance element is comprised of a resistor or a diode-connected transistor.

7. The voltage regulator according to claim 4, wherein the level shift circuit comprises:
    a third constant current circuit having one terminal connected to the power supply terminal,
    a third transistor having a gate connected to the input terminal of the level shift circuit, a source connected to the other terminal of the third constant current circuit, and a drain connected to the ground terminal,
    a fourth constant current circuit having one terminal connected to the power supply terminal,
    a fourth transistor having a gate connected to the source of the third transistor and a source connected to the other terminal of the fourth constant current circuit,
    an mth (where m is an integer greater than or equal to 5) constant current circuit having one terminal connected to the power supply terminal, and
    an mth transistor having a gate connected to a source of an m−1th transistor and a source connected to the other terminal of the mth constant current circuit and the output terminal of the level shift circuit.

* * * * *